(12) United States Patent
Adel et al.

(10) Patent No.: US 11,336,691 B2
(45) Date of Patent: May 17, 2022

(54) METHOD AND SYSTEM FOR MANAGING PRIVACY OF IN-HOME DEVICES

(71) Applicant: Verizon Patent and Licensing Inc., Arlington, VA (US)

(72) Inventors: Michael A. Adel, Piscataway, NJ (US); Manuel Enrique Caceres, Basking Ridge, NJ (US); Dayong He, Bridgewater, NJ (US); Jyotsna Kachroo, Millburn, NJ (US); Ray P. Hwang, Green Brook, NJ (US); Byunghun Choi, Summit, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 240 days.

(21) Appl. No.: 16/725,144

(22) Filed: Dec. 23, 2019

(65) Prior Publication Data
US 2021/0194927 A1    Jun. 24, 2021

(51) Int. Cl.
*H04L 29/06*   (2006.01)
*G16Y 30/10*   (2020.01)

(52) U.S. Cl.
CPC .......... *H04L 63/164* (2013.01); *G16Y 30/10* (2020.01); *H04L 63/0236* (2013.01); *H04L 63/0245* (2013.01); *H04L 63/105* (2013.01); *H04L 63/20* (2013.01)

(58) Field of Classification Search
CPC .............. H04L 63/164; H04L 63/0236; H04L 63/0245; H04L 63/105; H04L 63/20; G06Y 30/10
USPC ........................................................ 713/153
See application file for complete search history.

(56) References Cited

U.S. PATENT DOCUMENTS

| 6,708,218 B1 * | 3/2004 | Ellington, Jr | H04L 29/06 709/230 |
| 2018/0063079 A1 * | 3/2018 | Ding | H04L 63/0464 |

* cited by examiner

*Primary Examiner* — Michael S McNally

(57) ABSTRACT

A method, a device, and a non-transitory storage medium are described in which a privacy management service is provided. The privacy management service may be included in an in-home device. The privacy management service may multiple levels of privacy relating to traffic received from end devices that are connected to an external network via the in-home device. The privacy management service may include a smart speaker service. The privacy management service may allow a user to configure a privacy level of an end device. The privacy management service may include machine learning logic that may filter sensitive information included in received traffic.

20 Claims, 15 Drawing Sheets

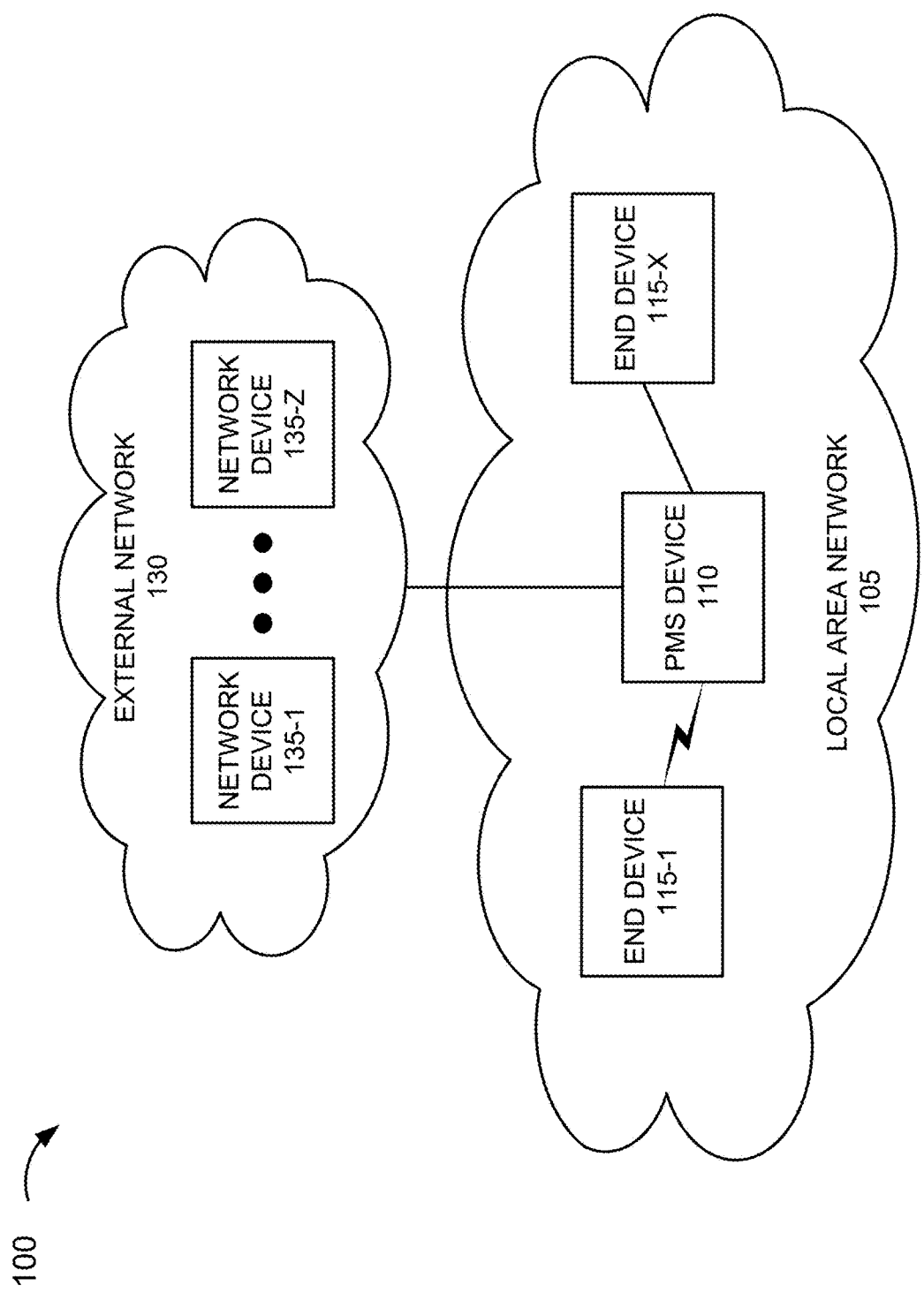

METHOD AND SYSTEM FOR MANAGING PRIVACY OF IN-HOME DEVICES

BACKGROUND

Various devices situated in a home or locale have been widely adopted so as to perform various functions and services, such as security cameras, thermostat monitors, smart speakers, smart televisions, and so forth. In some cases, data collected by these devices are sent to a network external from a user's local network. For example, the data may be transmitted via the Internet or other network and to a service provider, a device's original equipment manufacturer (OEM), or other entity for various purposes.

BRIEF DESCRIPTION OF THE DRAWINGS

FIG. 1 is a diagram illustrating an exemplary environment in which an exemplary embodiment of a privacy management service may be implemented;

DETAILED DESCRIPTION OF PREFERRED EMBODIMENTS

Figure 2A:
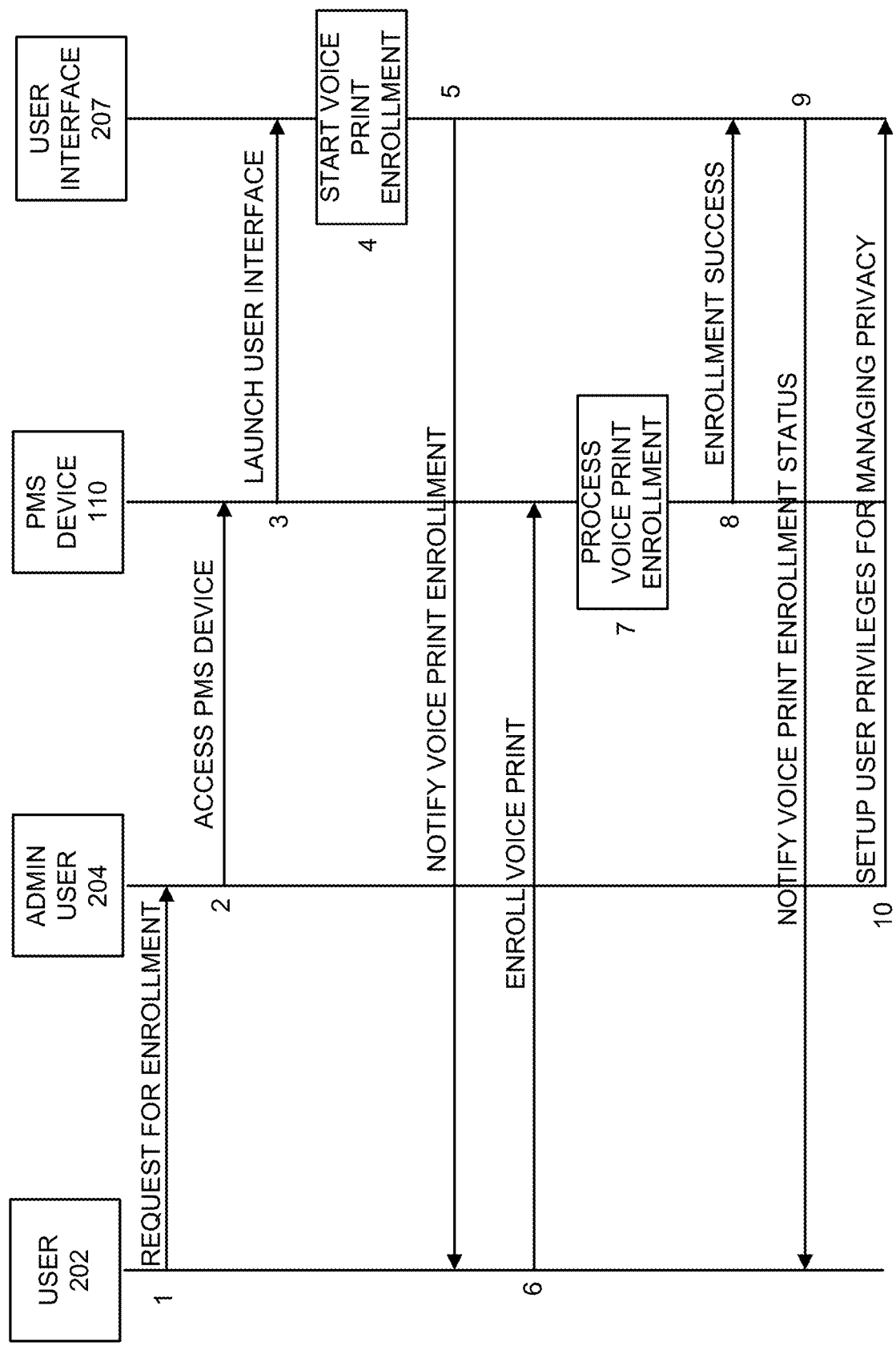
FIGS. 2A-2F are diagrams illustrating exemplary processes of an exemplary embodiment of the privacy management service may be implemented.

The following detailed description refers to the accompanying drawings. The same reference numbers in different drawings may identify the same or similar elements. Also, the following detailed description does not limit the invention.

Protecting end user privacy stemming from use of various devices in the home or elsewhere is a challenge and a concern to users. For example, various devices in a user's home may capture information (e.g., photos, videos, on-line activity, conversation, audio, etc.) and transmit the information to a device external from the user's home via the Internet or other external network. Additionally, for example, even when considering the same home device, such as a smart speaker, for different users and/or for the same user under various situations or circumstances, the desired privacy level may be different. In this regard, the ability to manage the dynamic nature of privacy among one or multiple users and one or multiple devices present various technical challenges.

According to exemplary embodiments, a privacy management service is described. According to an exemplary embodiment, an in-home device may include the privacy management service. For example, the in-home device may be customer premises equipment (CPE) associated with a service provider, a router (e.g., wireless, broadband, etc.), or other type of in-home device that may provide connectivity to a network external from the local network of a home or other locale. According to an exemplary embodiment, the in-home device may provide multiple privacy levels to a user according to multiple modes of operation. According to various exemplary embodiments, the modes of operation may include varying degrees of privacy, which are configurable by the user, ranging from no privacy (e.g., no filtering of traffic) to a high level of privacy (e.g., all traffic blocked or minimal traffic allowed to pass to an external network). According to an exemplary embodiment, the modes of operation may include a ternary choice among blocking a packet, transmitting a packet, and transmitting a portion of a packet (e.g., filtering sensitive information out). According to another exemplary embodiment, the modes of operation may include a binary choice among blocking a packet and transmitting a packet, or other binary combination (e.g., blocking and filtering, etc.).

According to an exemplary embodiment, the in-home device may include machine learning logic that learns user behaviors and preferences regarding privacy. According to an exemplary embodiment, the in-home device includes logic that monitors traffic for each end device subject to the privacy management service. According to an exemplary embodiment, based on the monitoring and various configurations as described herein, the in-home device may filter the traffic. According to an exemplary embodiment, the in-home device may include natural language understanding (NLU) logic that is configured to understand a user's intention (e.g., situation awareness, conversational awareness, content, destination, and other context factors) and apply a privacy level to traffic on a per end device and/or per end user basis. For example, the in-home device may recognize certain words, phrases, and/or topics and may prevent such data from being transmitted to an external network based on such recognition, as well as other factors, such as destination of data, situation/conversation, and so forth.

According to an exemplary embodiment, the in-home device may include logic that provides voice authentication. The in-home device may use voice authentication to control management and configuration of the privacy management service by an authorized user. The in-home device may also apply a privacy level associated with an identified user. According to an exemplary embodiment, the in-home device may indicate (e.g., a light or other indicator) a privacy mode in which the in-home device is currently operating.

According to some exemplary embodiments, the in-home device includes a smart speaker service (i.e., a digital assistant, e.g., SIRI by APPLE, ALEXA by AMAZON, GOOGLE ASSISTANT by GOOGLE or CORTANA by MICROSOFT, etc.). For example, the in-home device may include a smart speaker. The user may mute, enable, or disable, the smart speaker. According to other exemplary embodiments, the in-home device may not include an end device, such as a smart speaker.

According to an exemplary embodiment, the privacy management service includes an on-boarding service that allows a user to set-up the in-home device, select an end device subject to the privacy management service, and configure user preferences and administrative privileges. The user may assign a default mode of operation or other mode (e.g., customized, high, low, medium, none, or other modality) that provides a level of privacy. According to an exemplary embodiment, the privacy management service includes a graphical user interface (GUI) that allows the user to interface with the in-home device and the privacy management service.

According to an exemplary embodiment, the privacy management service may allow a user to manage individual network segments in a home environment or other network features (e.g., network slice, bandwidth, security groups, etc.).

According to an exemplary embodiment, the privacy management service may inform the user about a change in privacy level or the current privacy level at the in-home device, as described herein. The privacy management service may also inform a user when a non-authorized user attempts to change a privacy level. For example, the privacy management service may transmit a communication (e.g., a text message or other type of communication) to an authorized user. According to an exemplary embodiment, the in-home device may provide various levels of packet filtering to traffic in accordance with the level of privacy and mode of operation. For example, the in-home device may prevent a packet from being sent to an external network, such as the Internet, or allow the packet to be sent to the external network. According to an exemplary embodiment, the in-home device may operate according to a privacy mode, an autonomous mode, a learning or training mode, a disabled mode, and/or other modes, as described herein. According to an exemplary embodiment, the privacy management service may issue a command to an end device so as to conform to a given privacy level. The end device may indicate the privacy mode and level (e.g., via a light or other output device of the end device).

FIG. 1 is a diagram illustrating an exemplary environment 100 in which an exemplary embodiment of the privacy management service may be implemented. As illustrated, environment 100 includes a local area network 105 and an external network 130. Local area network 105 may include a privacy management service (PMS) device 110 and end devices 115-1 through 115-X (also referred to as end devices 115 and individually or generally as end device 115). External network 130 may include network devices 135-1 through 135-Z (also referred to as network devices 135 and individually or generally as network device 135).

The number, type, and arrangement of networks illustrated in environment 100 are exemplary. The number, the type, and the arrangement of end devices 115 in local area network 105, as illustrated and described, are exemplary. The number, the type, and the arrangement of network devices 135 in external network 130, as illustrated and described, are exemplary.

A device, such as PMS device 110, end device 115, and network device 135 may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, network device 135 may be implemented according to various computing architectures, such as centralized, distributed, cloud (e.g., elastic, public, private, etc.), edge, fog, and/or another type of computing architecture.

Environment 100 includes communication links between the networks, between PMS device 110 and end device 115, and between PMS device 110 and network devices 135. Environment 100 may be implemented to include wired, optical, and/or wireless communication links among the devices illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the privacy management service may use at least one of these planes of communication.

Local area network 105 may include a network that provides the privacy management service, as described herein. For example, local area network 105 may be implemented as an in-home network or other geographic-limited locale (e.g., business, etc.). According to other exemplary implementations, local area network 105 may be within an area of a motor vehicle.

PMS device 110 may be a device that provides the privacy management service, as described herein. For example, PMS device 110 may be implemented as customer premise equipment, a router (e.g., wireless router, broadband router, etc.), an in-home device, a home evolved Node B (HeNB), a home next generation Node B (HgNB), a home future generation node, or another type of device of local area network 105 (e.g., a vehicular device) that provides connectivity to external network 130. PMS device 110 may support wireless, optical, and/or wired communications. For example, PMS device 110 may support one or multiple wireless communication technologies, such as Wi-Fi, Long Term Evolution (LTE), LTE-Advanced (LTE-A), LTE-A Pro, 5G, and/or Worldwide Interoperability for Microwave Access (WiMAX). PMS device 110 may include various input ports, such as coaxial, Ethernet, and so forth, for wired and/or optical communications.

According to some exemplary embodiments, PMS device 110 may include a smart speaker that provides a smart speaker service. According to an exemplary embodiment, PMS device 110 includes a user interface that allows a user (not illustrated) to access, manage, and configure PMS device 110 and the privacy management service, as described herein. According to some exemplary embodiments, PMS device 110 may include a voice input service via which voice data may be communicated to end device 115.

End device 115 may include a device that obtains information and has communication capabilities to at least transmit the information to external network 130. For example, end device 115 may be implemented as a smart speaker, a video camera, an Internet of Things (IoT) device, a smart device, a sensor, a computer (e.g., desktop, laptop, etc.), a mobile device (e.g., a smartphone, a tablet, etc.), a smart television, a set top box, a router, a modem, a device that obtains information pertaining to a user and/or an environment of the user (e.g., home, etc.), or another type of end device that may or may not be operated by a user.

External network 130 may include various types of networks external from local area network 105. For example, external network 130 may include a wired network, a wireless network, an optical network, a private network, a public network, a terrestrial network, and/or a satellite network. By way of further example, external network 130 may include the Internet, a service provider network, a transport network, a data network, an application layer network (e.g., a cloud network, etc.), the World Wide Web, a radio access network (RAN), a core network, a packet-switched network, and/or other types of networks not specifically described herein.

Depending on the implementation, external network 130 may include various network devices, such as network devices 135-1 through 135-Z (also referred to as network devices 135 and generally or individually as network device 135). For example, network devices 135 may provide various applications, services, or other type of end device assets, such as servers (e.g., web, application, cloud, etc.), mass storage devices, and/or data center devices. Network devices 135 may also provide various network-related functions, such as routing, security, authentication and authorization, policy control, billing, load-balancing, and/or other types of network-based services relating to external network 130.

As described herein, the privacy management service may provide varying levels of privacy pertaining to traffic that traverses PMS device 110, such as traffic from end device 115 that is subject to the privacy management service. The privacy management service may also monitor and manage the operation of end device 115 so as to conform to a privacy level being enforced. Provided below are exemplary processes of the privacy management service.

FIG. 2A is a diagram illustrating an exemplary process of the privacy management service. For example, the process relates to an initialization process with a user and PMS device 110. For purposes of described, a user 202 may be a person undergoing the initialization process with PMS device 110. PMS device 110 may include a user interface 207 to interact with user 202. For example, user 202 may use an end device (not illustrated), such as a computer or a mobile device to access user interface 207 of PMS device 110. Alternatively, user 202 may access user interface 207 directly with PMS device 110. According to some exemplary implementations, user interface 207 may include login credentials.

Referring to FIG. 2A, in step (1), assume that user 202 seeks to set up voice credentials and user privileges for managing privacy. In step (2), user 202 may access PMS device 110. User 202 may configure or provide (e.g., previously configured credentials) to access PMS device 110 as an administrative user 204. In step (3), user 202/administrative user 204 may launch user interface 207 to access various configurations of the privacy management service, such as a vocal interface service. The vocal interface service may include allowing PMS device 110 to authenticate user 202 by way of speech input from user 202. In this way, the privacy management service may provide user identity awareness and may be able to recognize registered users and any associated user preferences, behaviors, privileges to manage end device 115, a privacy level or mode, and/or other services of the privacy management service, as described herein.

In step (4), user 202/administrative user 204 may initiate a voice print enrollment procedure via user interface 207. In step (5), user interface 207 may present a user interface to provide a voice sample. In step (6), user 202/administrative user 204 may provide speech input. For example, PMS device 110 may include a microphone to receive a sampling of user 202/administrative user 204's voice.

In step (7), PMS device 110 may process the voice sampling of user 202/administrative user 204 for purposes of voice authentication. According to this example, assume that the voice print enrollment was successful, such that in steps (8) and (9), user 202/administrative user 204 is notified of successful completion of the voice print enrollment via user interface 207.

In step (10), user 202/administrative user 204 may set up user privileges for managing the privacy management service. For example, various configurations pertaining to privacy level, listening or capturing of data by end device 115, data connection of end device 115 to external network 130, packet filtering, user privileges (e.g., ability to change or set the privacy level of PMS device 110, etc.), the ability to set or change an operational mode of PMS device 110 (e.g., privacy mode, training or learning mode, autonomous mode, etc.), and/or other types of configurations, as described herein, may be set up or changed.

Although FIG. 2A illustrates exemplary steps for the process of the privacy management service, according to other exemplary embodiments, the process may include different, additional, and/or fewer steps.

Figure 2B:
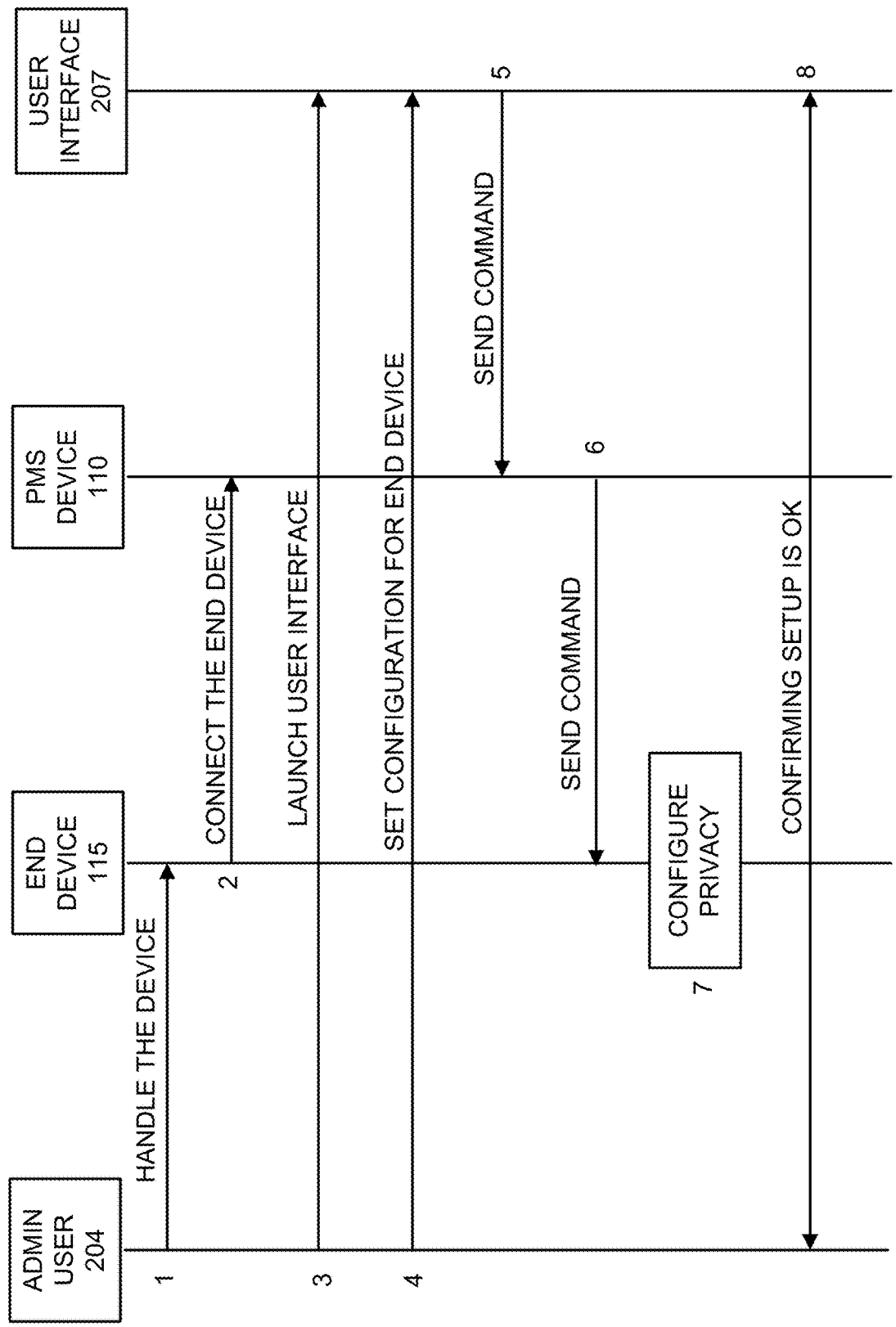

FIG. 2B is a diagram illustrating an exemplary process of the privacy management service. For example, the process relates to a user setting up a privacy mode and level of privacy for end device 115. Referring to FIG. 2B, in steps (1) and (2), administrative user 204 may set up end device 115 to connect end device 115 to PMS device 110. In step (3), administrative user 204 may access user interface 207 of PMS device 110, and in step (4) configure a privacy level for end device 115. For example, PMS device 110 may subject traffic of end device 115 to the privacy management service, as described herein. According to some exemplary implementations, administrative user 204 may configure a default privacy level for end device 115. For example, the default privacy level may be that all traffic is allowed to be transmitted via PMS device 110 or another level of privacy. Alternatively, according to an exemplary use case, the default privacy level may be that when PMS device 110 is used as a voice receiver (e.g., PMS device 110 includes a microphone), the voice data may be transmitted to end device 115 (e.g., a smart speaker). Additionally, for example, administrative user 204 may configure a privacy level at end device 115. For example, in steps (5) and (6), based on the configurations set up via user interface 207, user interface 207 via PMS device 110 may issue a command to end device 115. For example, with reference to end device 115 as a smart speaker, the command may be to turn on a microphone of the smart speaker. According to other examples, the command may cause end device 115 to turn off or perform some other type of operation. In step (7), in response to receiving the command, end device 115 may perform an operation in correspondence to the command and privacy configuration. In step (8), user interface 207 and/or administrative user 204 may indicate that the configuration is successful.

Although FIG. 2B illustrates exemplary steps for the process of the privacy management service, according to other exemplary embodiment, the process may include different, additional, and/or fewer steps. For example, end device 115 may indicate a privacy level. Additionally, or alternatively, PMS device 110 may provide a cue (e.g., visual, auditory, etc.) that the set up was successful.

Figure 2C:
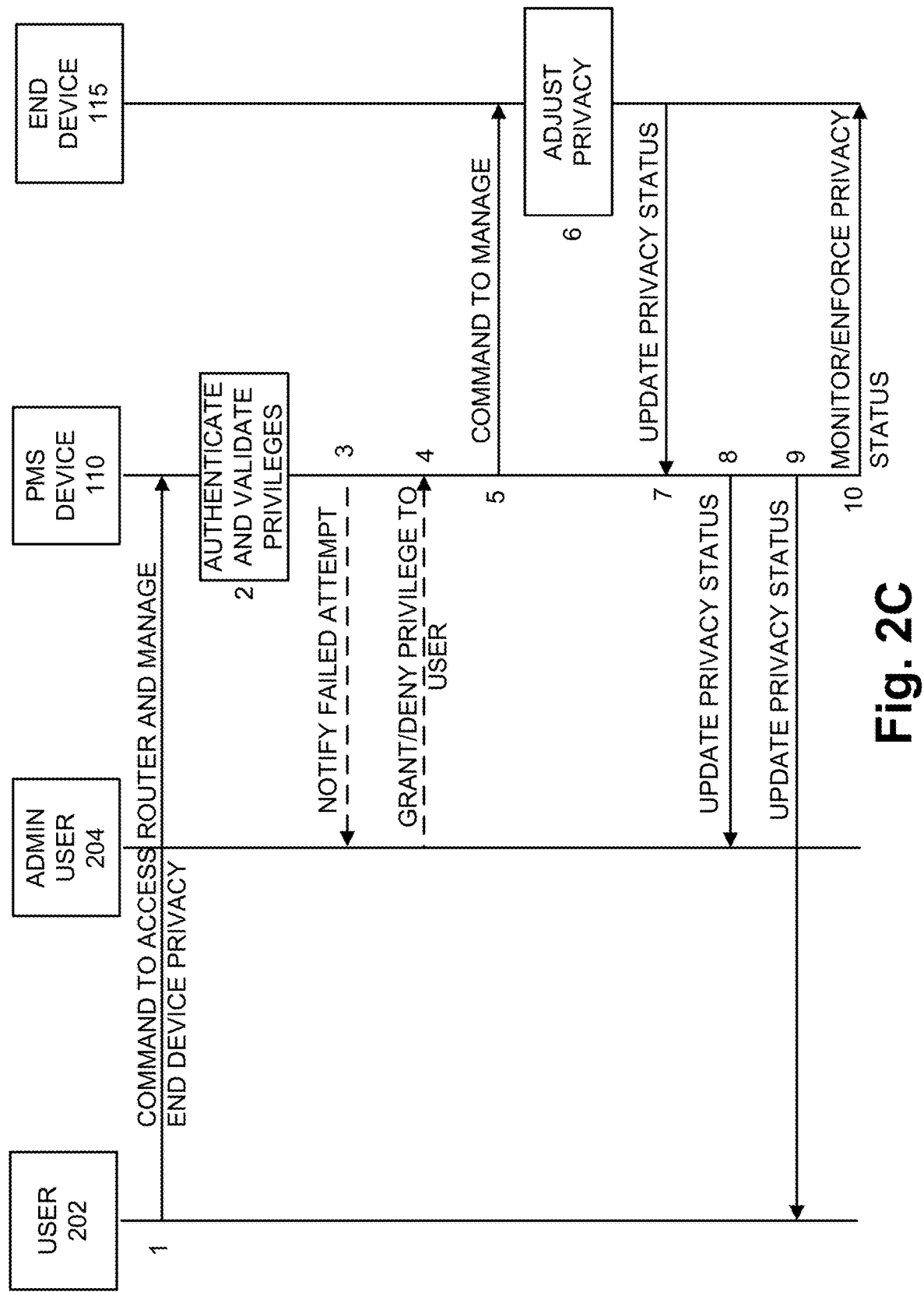

FIG. 2C is a diagram illustrating an exemplary process of the privacy management service. For example, the process relates to the voice interface service and the notification service of the privacy management service. According to exemplary scenario, assume user 202 wishes to change the privacy level relating to end device 115. Referring to FIG. 2C, in step (1), user 202 may vocally speak to PMS device 110 so as to manage the privacy of end device 115. As previously described, according to some embodiments, PMS device 110 may include a microphone and natural language understanding logic. In response to receiving the vocal input, in step (2), PMS device 110 may authenticate and validate the privileges associated with user 202. For example, as previously described in FIG. 2A, PMS device 110 may include a voice interface service.

Depending on the circumstances and for the sake of description, FIG. 2C illustrates various outcomes resulting from the authentication and validation process. For example, in step (3), when user 202 does not successfully authenticate and/or user 202 does not have privileges to manage end device 115, as part of the notification service, PMS device 110 may notify administrative user 204 of the failed attempt. According to an exemplary implementation, PMS device 110 may notify administrative user 204 via a communication service (e.g., text, email, automated telephone call, etc.). According to another exemplary implementation, PMS device 110 may provide the notification at PMS device 110, such as generating a visual cue (e.g., light flashing, etc.) or an auditory cue (e.g., emitting a particular sound, playing an automated vocal message via a speaker of PMS device 110, etc.).

In step (3), administrative user 204 may grant or deny the privilege to manage a privacy level of end device 115, and in step (4) communicate that to PMS device 110. Alternatively, when user 202 is not voice authenticated or has not set up the voice interface service, administrative user 204 may grant or deny access to PMS device 110.

In step (5), when user 202 successfully authenticated and had privileges, or was granted access by administrative user 204, PMS device 110 may generate and transmit a command to end device 115. For example, the command may cause end device 115 turn off, turn on a microphone, turn off a microphone, or perform some other operation. In step (6), based on receiving the command, end device 115 may perform an operation in accordance with the received command. In step (7), end device 115 may transmit a response that indicates an updated privacy status. In step (8), as a part of the notification service, PMS device 110 may communicate to administrative user 204 to indicate that the privacy level for end device 115 has been updated. According to this example, in step (9), PMS device 110 may also communicate to user 202. In step (10), PMS device 110 may monitor and enforce the privacy status of end device 115. For example, PMS device 110 may manage various configurations such as a connection state of end device 115 in relation to external network 130, a listening or capturing data state of end device 115 (e.g., microphone turned on, turned off, a video camera or other sensor turned on or turned off). PMS device 110 may also block, allow, or filter traffic received from end device 115.

Figure 3:
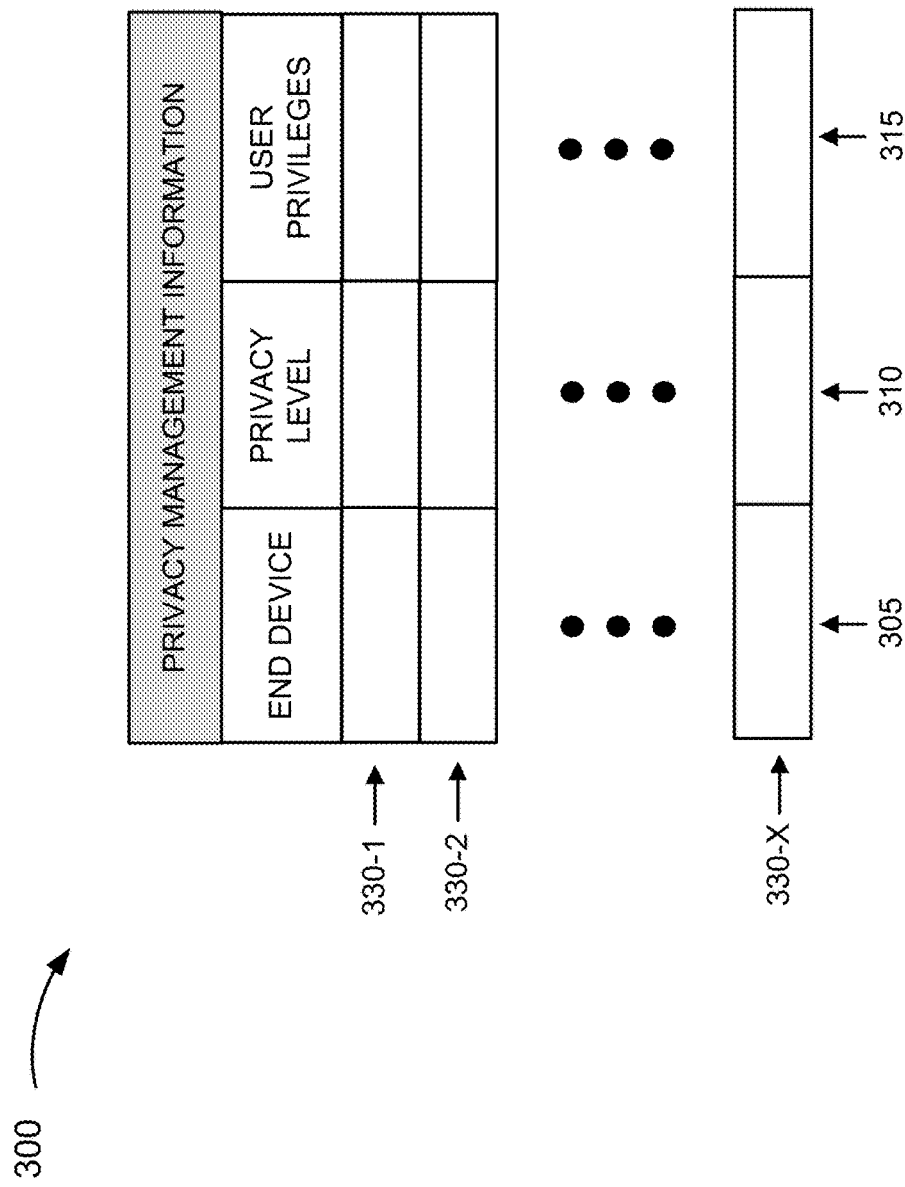
FIG. 3 is a diagram illustrating exemplary privacy management information of an exemplary embodiment of the privacy management service.

Although FIG. 2C illustrates exemplary steps for the process of the privacy management service, according to other exemplary embodiment, the process may include different, additional, and/or fewer steps. For example, PMS device 110 may store privacy management information pertaining to end device 115. Referring to a table 300 in FIG. 3, exemplary privacy management information is shown. Table 300 may include an end device field 305, a privacy level field 310, and a user privileges field 315. As further illustrated, table 300 includes entries 330-1 through 330-X (also referred as entries 330, or individually or generally as entry 330) that each includes a grouping of fields 305, 310, and 315 that are correlated (e.g., a record, etc.). Privacy management information is illustrated in tabular form merely for the sake of description. In this regard, privacy management information may be implemented in a data structure different from a table (e.g., a list, a flat file, etc.), a database, or another type of data file.

End device field 305 may store information pertaining to end device 115 that is subject to the privacy management service. For example, end device field 305 may store a network address (e.g., an Internet Protocol (IP) address, etc.) of end device 115 and/or a unique identifier of end device 115. Privacy level field 310 may store information that indicates a privacy level for end device 115. For example, the privacy level may range from none through high or some other scale or degrees of privacy. User privileges field 315 may store information that indicates a user authorized to change the privacy level of end device 115.

According to other exemplary implementations, table 300 may store additional, fewer, and/or different instances of privacy management information in support of the privacy management service, as described herein. Additionally, the number of entries 330 is exemplary.

Referring back to FIG. 2C, in step (2), PMS device 110 may query privacy management information to determine whether the user 202 is an authorized user to change the privacy level of end device 115. Additionally, for example, in step (8), PMS device 110 may update the privacy management information (e.g., privacy level field 310) to reflect the current privacy level of end device 115.

Figure 2D:
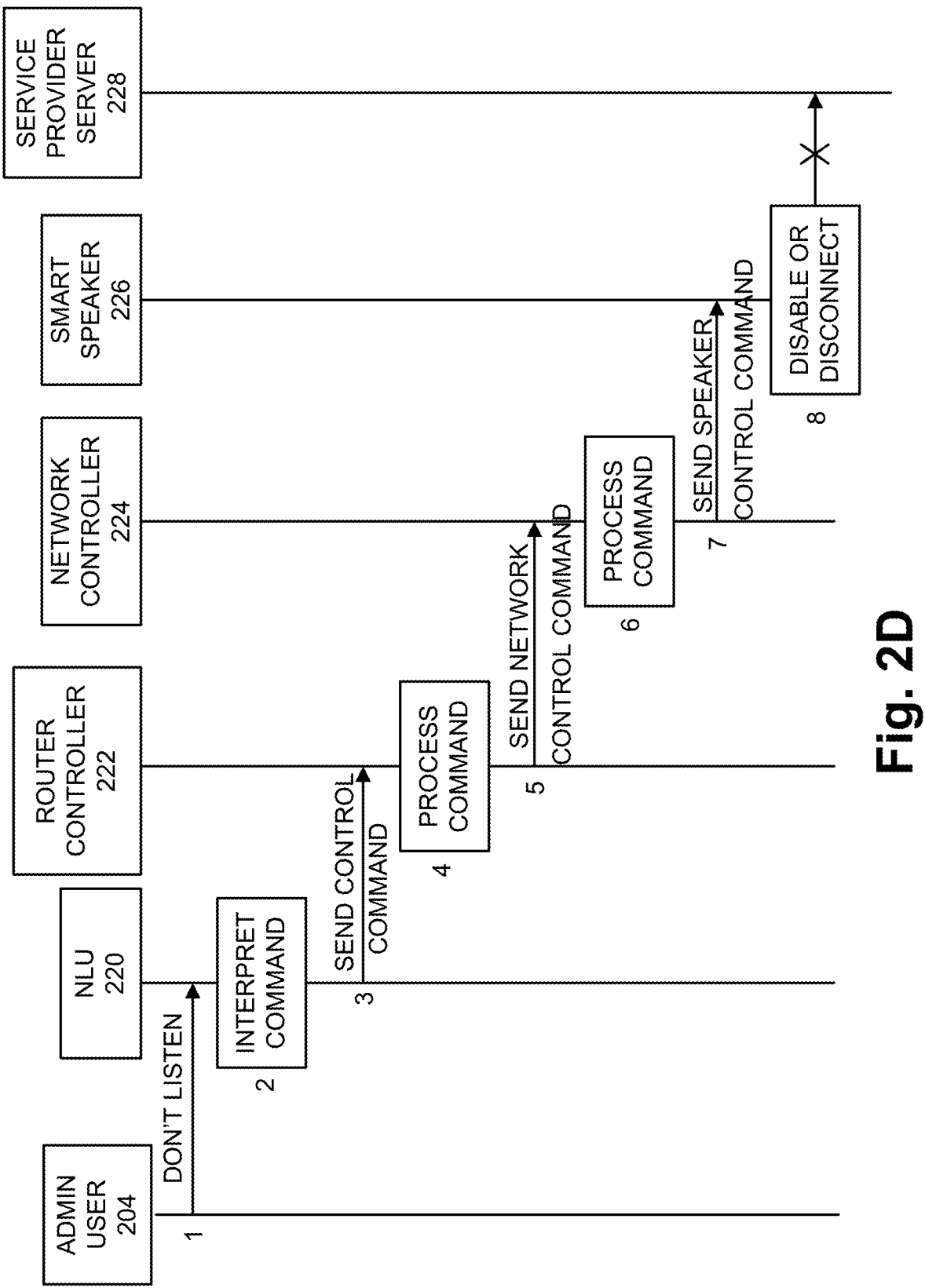

FIG. 2D is a diagram illustrating an exemplary process of the privacy management service. For example, the process relates to the smart speaker service of PMS device 110. As previously described, according to some exemplary embodiments, PMS device 110 may include a smart speaker. Referring to FIG. 2D, as illustrated, PMS device 110 may include a natural language understanding component 220, a router controller 222, a network controller 224, and a smart speaker 226. According to other exemplary embodiments, PMS device 110 may include additional, different, and/or fewer components.

Natural language understanding component 220 may include logic that provides natural language processing of speech input. For example, PMS device 110 may include a microphone to receive voice input from a user. Natural language understanding component 220 may convert the voice input to text based on speech recognition logic and interpret the text based on natural language understanding logic. PMS device 110 may also include, for example, natural language generation logic and text-to-speech logic to output (e.g., via a speaker) speech to a user. As an example, PMS device 110 may output speech as a part of the notification service and/or the voice interface service, as described herein.

Router controller 222 may include logic that interprets commands received from natural language understanding component 220. Router controller 222 may include logic that generates control commands that relate to various functions of PMS device 110. Network controller 224 may include logic that interprets commands received from router controller 222. Network controller 224 may include logic that generates commands to various components of PMS device 110, such as smart speaker 226.

Smart speaker 226 may include logic that provides a smart speaker service. For example, smart speaker 226 may include a voice command device that may control other smart devices. Additionally, smart speaker 226 may provide virtual assistant services. Service provider server 228 may include a network device (e.g., network device 135) of an external network (e.g., external network 130) that may support, for example, a smart speaker service and/or a virtual assistant service.

In step (1), administrative user 204 may issue a command to PMS device 110. The command may relate to smart speaker 226 and the associated smart speaker service, such as to not listen (e.g., not listen to a conversation) and/or disconnect from service provider server 228. In step (2), natural language understanding component 220 may receive the command (e.g., via a microphone (not shown)) and interpret the command. In step (3), based on the interpretation of the command, natural language understanding component 220 may generate and send a control command to router controller 222. In step (4), based on receiving the control command, router controller 222 may process (e.g., interpret) the control command. In step (5), router controller 222 may generate and send the network control command to network controller 224. In step (6), based on receiving the network control command, network controller 224 may process (e.g., interpret) the network control command. In step (7), network controller 224 may generate and send a speaker control command to smart speaker 226. In step (8), smart speaker 226 may process (e.g., interpret) the speaker control command. According to this example, smart speaker 226 may disable the smart speaker service or portion thereof (e.g., not listen to conversation) and/or disconnect from service provider server 228.

Although FIG. 2D illustrates exemplary steps for the process of the privacy management service, according to other exemplary embodiment, the process may include different, additional, and/or fewer steps.

Figure 2E:
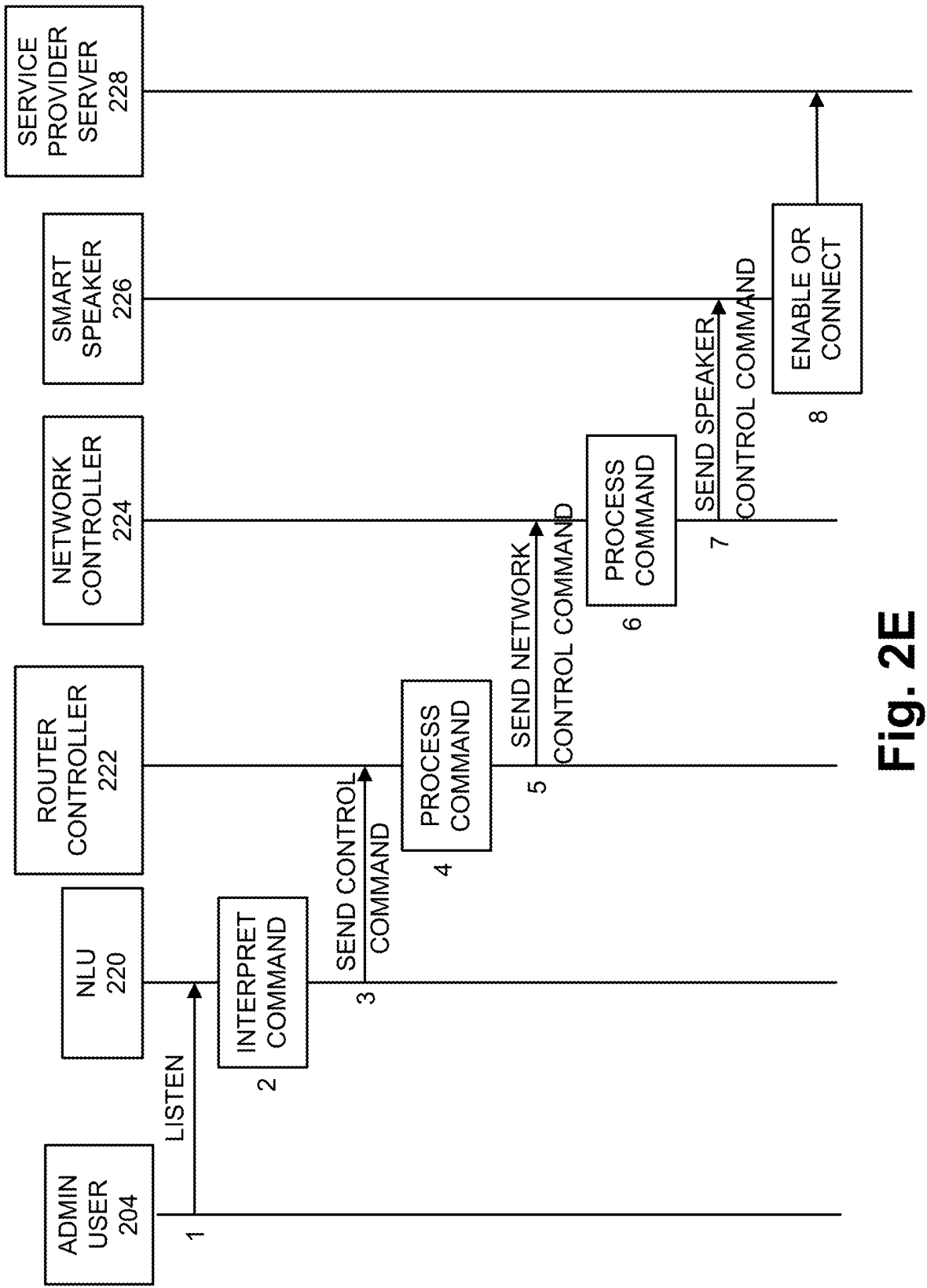

FIG. 2E is a diagram illustrating an exemplary process of the privacy management service. For example, the process relates to the smart speaker service of PMS device 110. In contrast to FIG. 2D, the process of FIG. 2E may enable the smart speaker service (or a portion thereof).

Referring to FIG. 2E, in step (1), administrative user 204 may issue a command to PMS device 110. The command may relate to smart speaker 226 and the associated smart speaker service, such as to listen (e.g., listen to a conversation) and/or connect to service provider server 228. In step (2), natural language understanding component 220 may receive the command (e.g., via a microphone (not shown)) and interpret the command. In step (3), based on the interpretation of the command, natural language understanding component 220 may generate and send a control command to router controller 222. In step (4), based on receiving the control command, router controller 222 may process (e.g., interpret) the control command. In step (5), router controller 222 may generate and send the network control command to network controller 224. In step (6), based on receiving the network control command, network controller 224 may process (e.g., interpret) the network control command. In step (7), network controller 224 may generate and send a speaker control command to smart speaker 226. In step (8), smart speaker 226 may process (e.g., interpret) the speaker control command. According to this example, smart speaker 226 may enable the smart speaker service or portion thereof (e.g., listen to conversation) and/or connect to service provider server 228.

Although FIG. 2E illustrates exemplary steps for the process of the privacy management service, according to other exemplary embodiment, the process may include different, additional, and/or fewer steps.

Figure 2F:
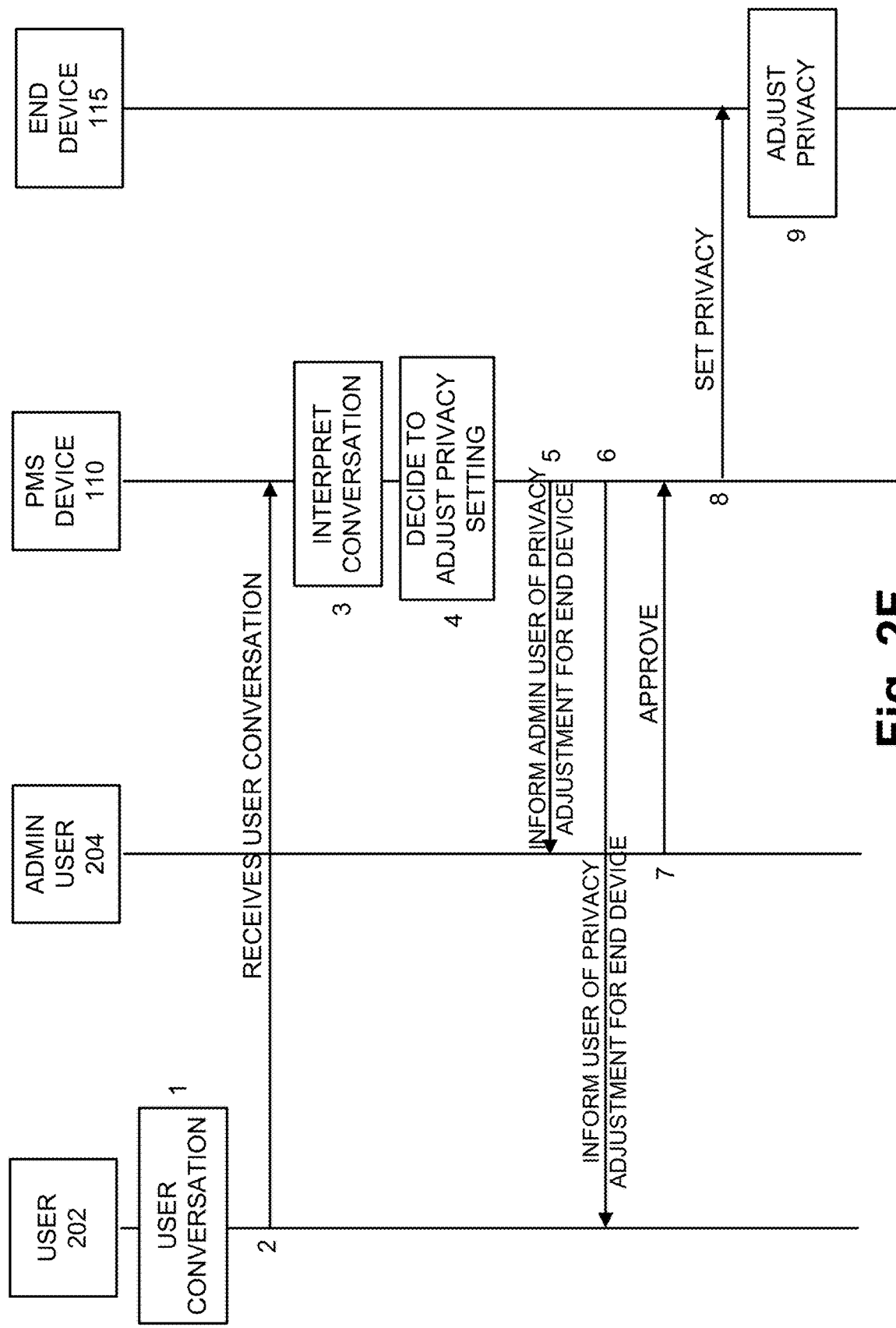

FIG. 2F is a diagram illustrating an exemplary process of the privacy management service. For example, the process relates an autonomous privacy service of the privacy management service. For example, according to an exemplary embodiment, PMS device 110 may dynamically adjust the privacy level at PMS device 110 and/or end device 115 based on artificial intelligence/machine learning logic and context factors. For example, in relation to user conversation, PMS device 110 may be trained to identify privacy issues based on recognition of trigger words and/or phrases that signify a privacy issue. PMS device 110 may store trigger words and/or phrases that are deemed sensitive or warrant packet filtering. Additionally, for example, PMS device 110 may include artificial intelligence/machine learning logic that autonomously adjusts a privacy level at PMS device 110 and/or at end device 115 (e.g., via transmission of a command to end device 115) based on user behaviors and user preferences. In this regard, PMS device 110 may build an intelligence and situational awareness that may relate to a particular user, an area of local area network (e.g., a room in a house, a floor of a house, the whole house, etc.), date and time, day of the week, end device 115, historical traffic from end device 115, historical vocal commands from users to adjust the privacy level and/or other configurations of the privacy management service, and/or other context information. Additionally, context information may include the volume of a recorded voice, a detected mood or sentiment, number of distinct voices detected in a recording, and/or distinct user speech pattern.

Referring to FIG. 2F, in step (1), according to an exemplary scenario, assume that user 202 is having a conversation with another person regarding a topic that may be considered private (e.g., medical related, etc.). In step (2), PMS device 110 may receive the conversation via a microphone. In step (3), PMS device 110 may interpret the conversation (e.g., natural language understanding component 220), and in step (4), PMS device 110 may determine to adjust the privacy setting of end device 115. For example, PMS device 110 may recognize a trigger word and/or phrase included in the conversation. In step (5), PMS device 110 may communicate to administrative user 204 relating to the determined adjustment for end device 115. Optionally, in step (6), PMS device 110 may communicate to user 202 as well. In step (7), administrative user 204 may communicate to PMS device 110 to indicate approval of the privacy adjustment. In step (8), based on receiving the approval, PMS device 110 may communicate an adjusted privacy level to end device 115. For example, end device 115 may be a smart speaker, and the adjustment may be to turn off a microphone of the smart speaker. In step (9), end device 115 may adjust the privacy level (e.g., turns off a microphone).

Although FIG. 2F illustrates exemplary steps for the process of the privacy management service, according to other exemplary embodiment, the process may include different, additional, and/or fewer steps. For example, PMS device 110 may notify administrative user 204 and optionally user 202 that the privacy level has been adjusted.

Figure 4:
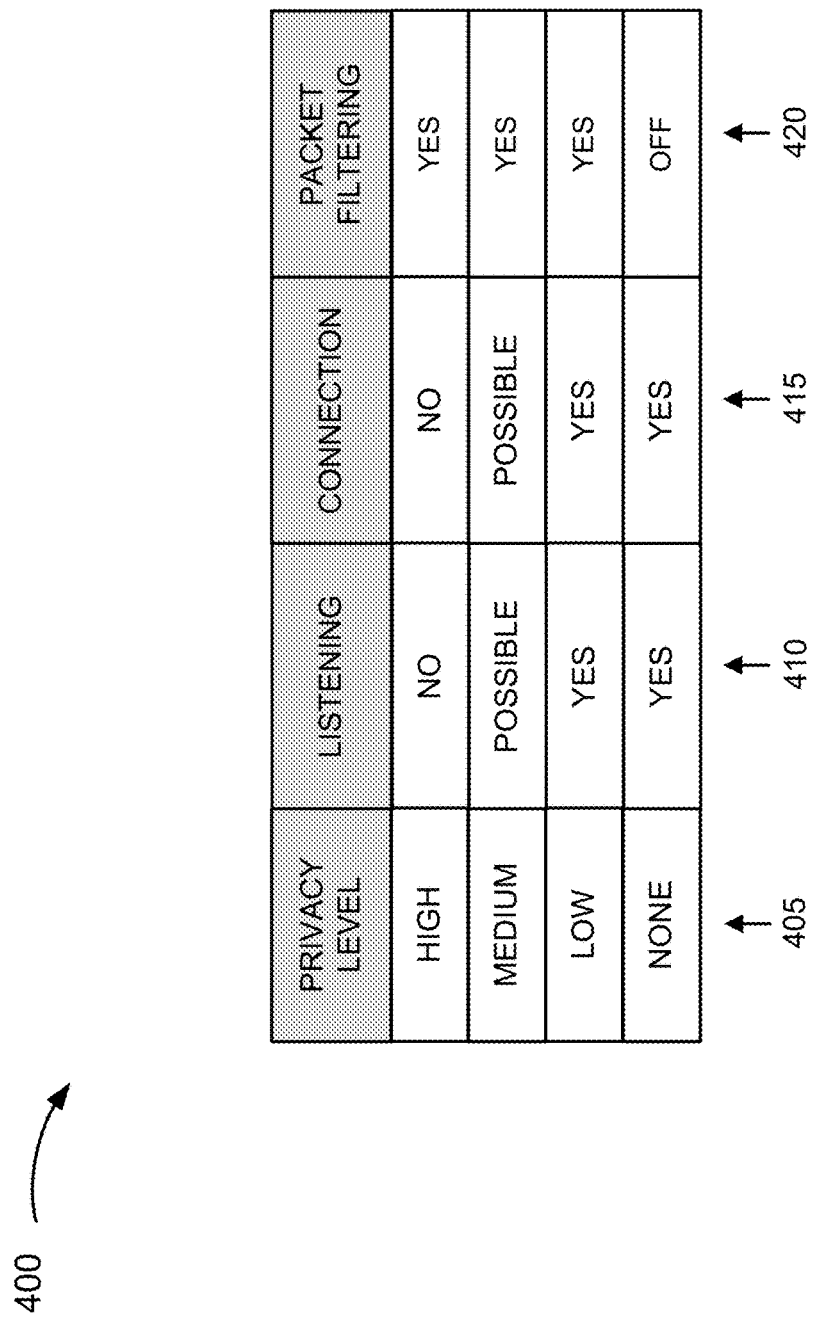
FIG. 4 is a diagram illustrating exemplary privacy configuration information of an exemplary embodiment of the privacy management service.

FIG. 4 is a diagram illustrating exemplary privacy configuration information of the privacy management service. For example, PMS device 110 may provide various degrees of privacy, may provide various levels of listening (e.g., audio data, video data, etc.), may have various connection states to network devices external from a local area network, and may perform varying degrees of packet filtering of traffic from end devices 115. The values and correlations between the privacy configurations are exemplary. Additionally, or alternatively, according to other exemplary embodiments, a configuration may not be co-dependent and/or correlate to another configuration. Additionally, according to other exemplary embodiments, the privacy management service may include additional and/or different privacy configurations that relate to other services, as described herein.

Referring to FIG. 4, a table 400 illustrates a privacy level field 405, a listening field 410, a connection field 415, and a packet filtering field 420. Privacy level field 405 may indicate a level of privacy afforded under the privacy management service. According to this example, there may be a high privacy level, a medium privacy level, a low privacy level, and a no privacy level. According to other exemplary embodiments, the number and/or the nomenclature of a privacy level may be different. The privacy level may relate to various aspects of privacy, a user, and the environment of the user (e.g., home, vehicle, etc.), such as the transmission of traffic from PMS device 110 to external network 130, the operational state of end device 115 (e.g., a microphone turned on or off, a video camera turned on or off, end device 115 turned on or off, etc.), the transmission of traffic from end device 115 to PMS device 110 and/or external network 130, the content of the traffic blocked or transmitted (e.g., all, none, some, etc.), and other factors.

Based on the level of privacy, PMS device 110 may or may not have end device 115 listen or capture data (e.g., audio data, video data, Web data, Internet data, metadata, etc.) as illustrated in listening field 410. For example, as illustrated, when in a high privacy mode, listening or capturing data may not be permitted. When in a medium privacy mode, listening or capturing of data may or may not be permitted, and when in a low or no privacy mode, listening or capturing data may be permitted. According to other exemplary embodiments, the listening and/or capturing of data configuration may be different in relation to the level of privacy.

Additionally, based on the level of privacy, PMS device 110 may or may not permit end device 115 to have a connection to external network 130. According to some embodiments, end device 115 may have a connection to external network 130 via PMS device 110. According to other embodiments, end device 115 may have a connection to external network 130 not via PMS device 110. For example, according to one exemplary use case, PMS device 110 may provide Wi-Fi access to external network 130, and end device 115 may have Fourth Generation (4G) and/or Fifth Generation (5G) RAN capabilities that permit access to external network 130. PMS device 110 may issue a command to end device 115 to tear down the connection, and may periodically monitor end device 115 (e.g., sending probe requests) to confirm that the connection is not re-established. Additionally, end device 115 may indicate a privacy level (e.g., visually, etc.) that may be identified by user 202/204.

As an example, when in a high privacy mode, there may be no connections permitted to ensure that private data may not be transmitted. Conversely, when in a no privacy mode, a connection is permitted. When operating in a medium or a low privacy mode, a connection may or may not be permitted. According to other exemplary embodiments, the connection configuration may be different in relation to the level of privacy.

In relation to packet filtering, when in a high privacy mode, there may be packet filtering. For example, even if end device 115 may not be permitted to listen and have a connection, PMS device 110 may drop any traffic received from end device 115. Conversely, when operating in a no privacy mode, there may be no packet filtering and all traffic may be transmitted to external network 130. When in a medium or a low privacy mode, there may be packet filtering. For example, the packet filtering may include removal of sensitive information from traffic, as described herein. According to an exemplary embodiment, the packet filtering configuration may provide a ternary choice based on the privacy level. For example, the ternary choice may include transmission of a packet or traffic, the blocking of the packet or traffic, and the partial blocking and the partial transmission of a packet or traffic. The partial blocking may include removal of sensitive information, which may be identified and extracted from a packet based on machine learning, user preferences, user behavior, and context information, as described herein. According to other exemplary embodiments, the packet filtering configuration may be different in relation to the level of privacy.

As previously described, according to an exemplary embodiment, the privacy management service may include a learning or training mode, an autonomous mode, a privacy mode, and other modes, as described herein. According to some exemplary embodiments, the privacy management service may include packet filtering in relation to the mode. For example, in the learning mode, the packet filtering may be based on a user's approval of the data to transmit the data to external network 130, the destination address of the data, another configuration (e.g., privacy level, etc.), and/or other context data (e.g., end device 115, etc.).

According to another example, in relation to the autonomous mode, the packet filtering may be based on the machine learning or artificial intelligence logic relating to user behavior, user preferences, destination addresses, conversational awareness, situational awareness, and/or other context data (e.g., end device 115, etc.). The packet filtering may also depend on the privacy level. The artificial intelligence of the privacy management service may filter out sensitive information before the data is transmitted. For example, data that may be directed to data archiving and/or data mining by a service provider of external network 130, such data may be filtered out before transmission. According to another example, when sensitive information is not required for a successful communication to external network 130, such sensitive information may be filtered out. According to yet another example, the machine learning or artificial intelligence logic may understand a conversation and its context, such that when a user is asked for sensitive information and the user provides the sensitive information, that the machine learning or artificial intelligence logic may determine that the sensitive information is required and/or that the other person is a trusted party, such that the sensitive information may not be filtered out. In this way, the packet filtering of the privacy management service may or may not filter out data relating to conversation or other types of data based on various factors, as described herein. According to yet another example, in relation to the privacy mode, the packet filtering may block all traffic from any end device 115 or a subset of end devices 115.

Figure 5:
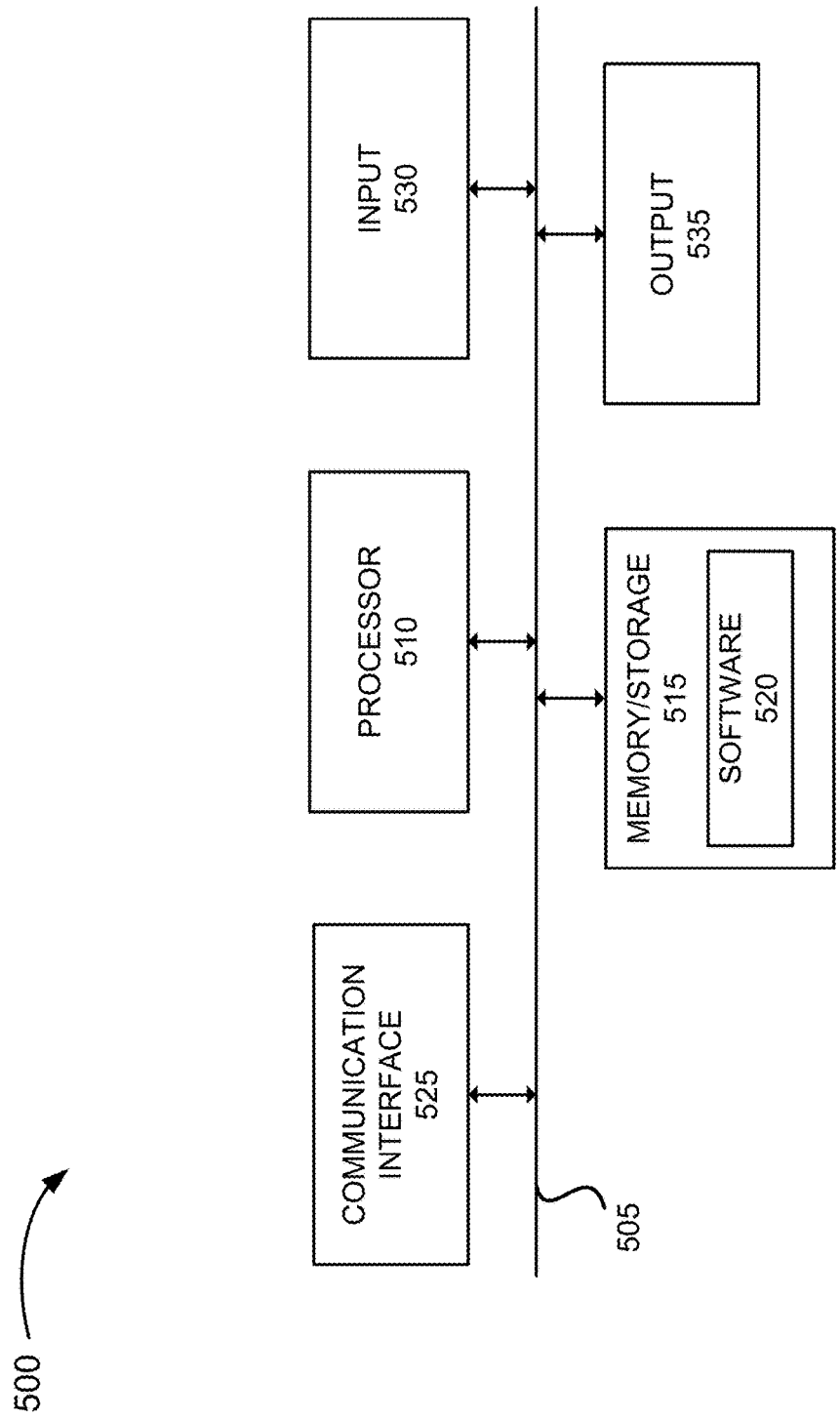
FIG. 5 is a diagram illustrating exemplary components of a device that may correspond to one or more of the devices illustrated and described herein.

FIG. 5 is a diagram illustrating exemplary components of a device 500 that may be included in one or more of the devices described herein. For example, device 500 may correspond to PMS device 110, end device 115, network device 135, service provider server 228, and other types of network devices or logic, as described herein. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among one or multiple components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, etc.

Memory/storage 515 includes one or multiple memories and/or one or multiple other types of storage mediums. For example, memory/storage 515 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 515 may include drives for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. As an example, with reference to PMS device 110, software 520 may include an application that, when executed by processor 510, provides a function of the privacy management service, as described herein. Additionally, for example, with reference to end device 115, software 520 may include an application that, when executed by processor 510, provides a function of the privacy management service. Software 520 may also include firmware, middleware, microcode, hardware description language (HDL), and/or other form of instruction. Software 520 may also be virtualized. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces, wired interfaces, and/or optical interfaces. For example, communication interface 525 may include one or multiple transmitters and receivers, or transceivers. Communication interface 525 may operate according to a protocol stack and a communication standard. Communication interface 525 may include an antenna. Communication interface 525 may include various processing logic or circuitry (e.g., multiplexing/de-multiplexing, filtering, amplifying, converting, error correction, application programming interface (API), etc.). Communication interface 525 may be implemented as a point-to-point interface, a service based interface, etc. Communication interface 525 may be implemented to include logic that supports the privacy management service, such as the transmission and reception of messages (e.g., commands, etc.), packet filtering, establishment and tear down of a connection, and so forth, as described herein.

Input 530 permits an input into device 500. For example, input 530 may include a keyboard, a mouse, a display, a touchscreen, a touchless screen, a button, a switch, an input port, speech recognition logic, and/or some other type of visual, auditory, tactile, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 500 may be implemented in the same manner. For example, device 500 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a network.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a process and/or a function, as described herein. Alternatively, for example, according to other implementations, device 500 performs a process and/or a function as described herein based on the execution of hardware (processor 510, etc.).

Figure 6A:
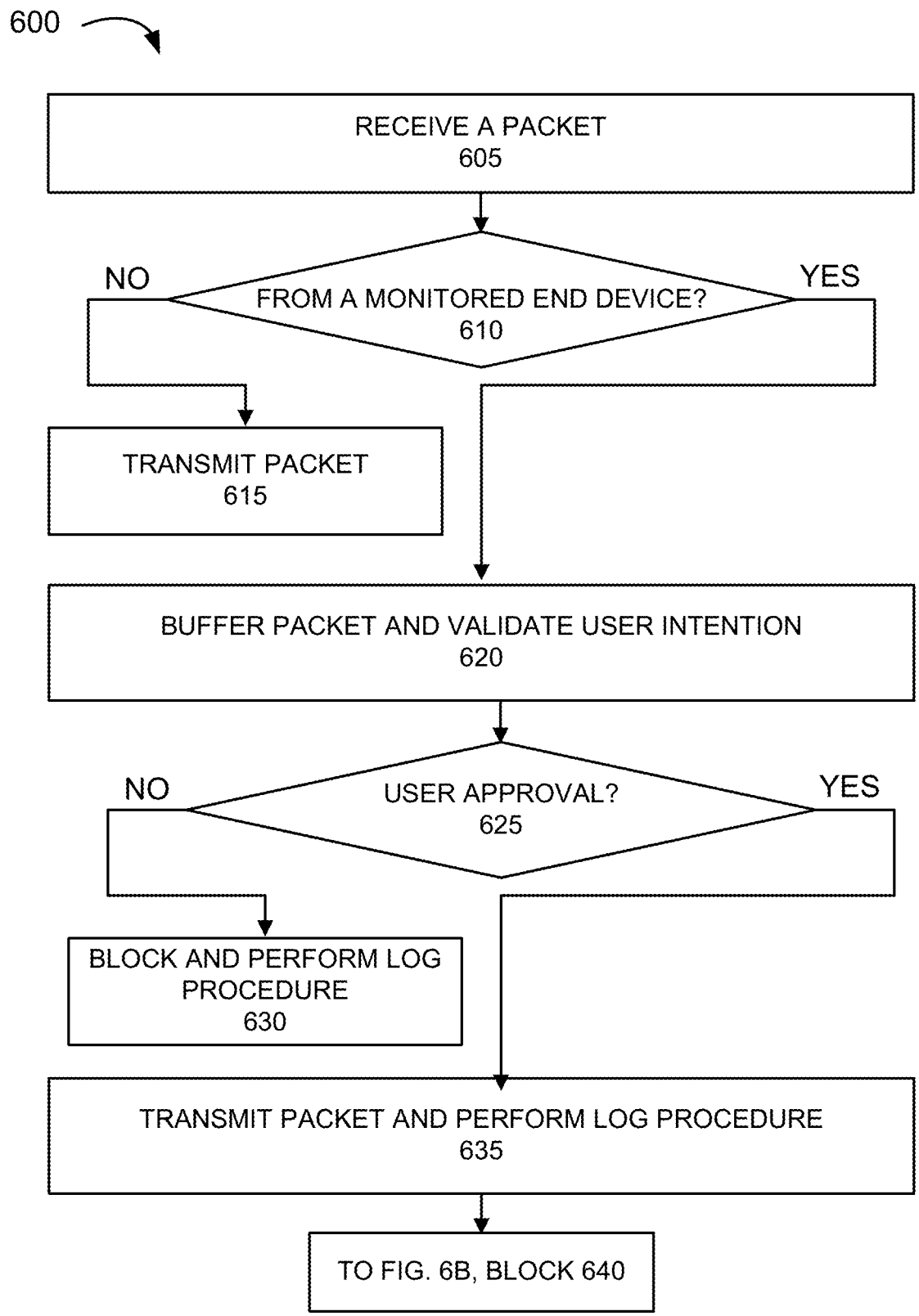
FIGS. 6A and 6B are a flow diagram illustrating an exemplary process of an exemplary embodiment of the privacy management service.
Figure 6B:
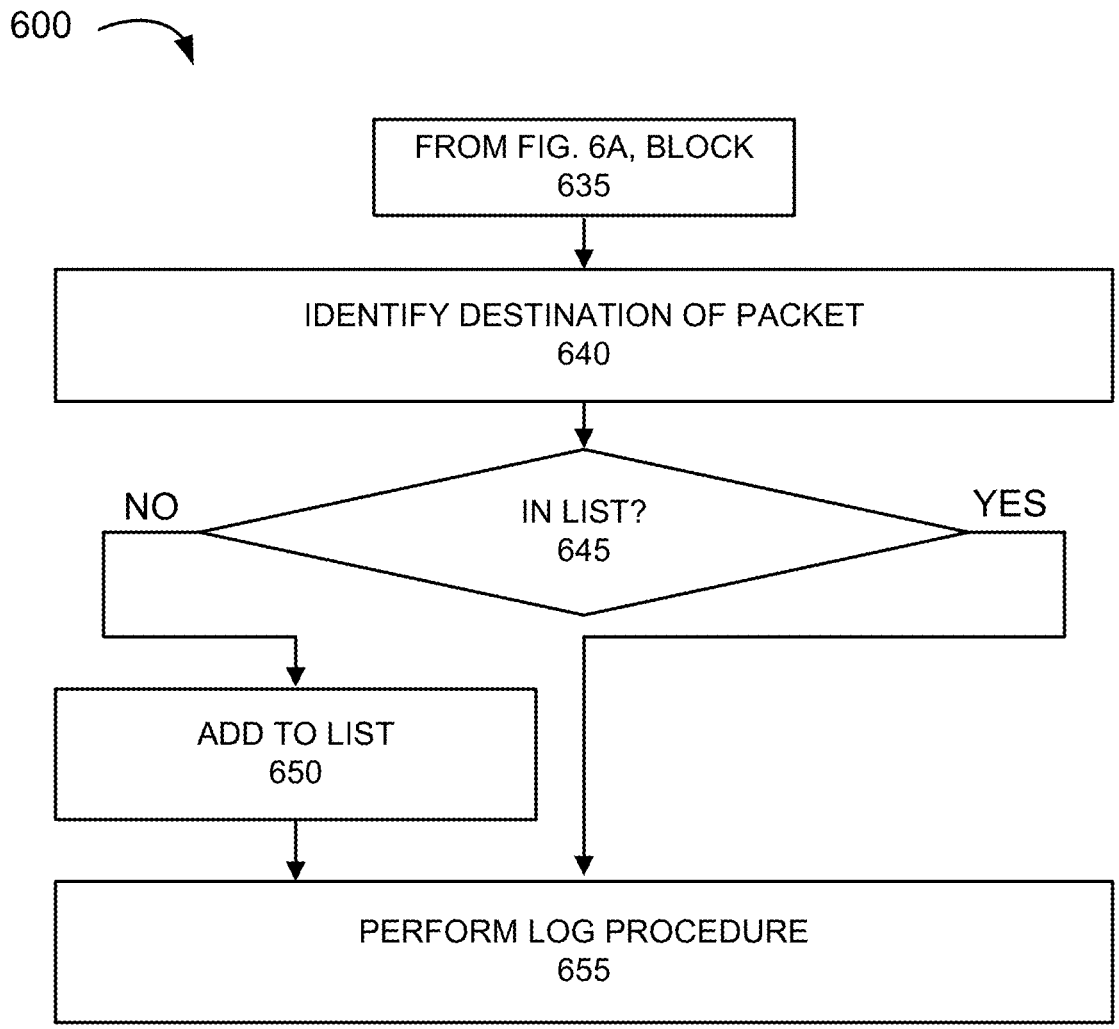

FIGS. 6A and 6B are a flow diagram illustrating an exemplary process 600 of an exemplary embodiment of the privacy management service. According to an exemplary embodiment, PMS device 110 may perform steps of process 600. According to an exemplary implementation, processor 510 executes software 520 to perform a step illustrated in FIGS. 6A and 6B, and described herein. Alternatively, a step illustrated in FIGS. 6A and 6B and described herein, may be performed by execution of only hardware. According to some exemplary embodiments, process 600 may be performed when PMS device 110 operates in a learning or training mode, as described herein.

Referring to FIG. 6A, in block 605, a packet may be received. For example, PMS device 110 may receive a packet from end device 115. In block 610, it may be determined whether the end device is monitored or not. For example, PMS device 110 may determine whether end device 115 is included in the privacy management information (e.g., table 300). PMS device 110 may correlate the packet to end device 115 based on header information (e.g., source network address) of the packet, for example, and/or other information (e.g., port number, etc.).

When it is determined that the packet is not from a monitored end device (block 610—NO), the packet may be transmitted (block 615). For example, PMS device 110 may determine that the packet may be received from end device 115 that is not subject to the privacy management service. When it is determined that the packet is from a monitored end device (block 610—YES), the packet may be buffered and user intention may be validated (block 620). For example, PMS device 110 may buffer the packet and communicate to a user or administrative user. The communication may seek approval or denial of transmission of the packet. The user or administrative user may communicate to PMS device 110 an approval or a denial. According to various exemplary implementations, the communication may include an auditory and/or visual cue, a message (e.g., text, etc.), pressing of a button or a vocal command, use of a mobile application or user interface of PMS device 110, and/or other types of mechanisms.

When it is determined that the user does not approve of the transmission of the packet (block 625—NO), the packet may not be transmitted (e.g., blocked) (block 630). For example, PMS device 110 may drop or block the packet from being transmitted. PMS device 110 may also perform a logging procedure. For example, the logging procedure may include storing a portion of the packet (e.g., header information,) and date, time, and/or day information. A user may have access to the logged data. According to an exemplary implementation, the header information may be header information of an Internet Protocol (IP) version 4 or version 6 header. For example, the stored IP v4 header information may include a source IP address, a destination IP address, a total length, type of service, identification, option information, and/or other information pertaining to the IP standard. Similarly, the header information may include one or multiple instances of information included in the IP v6 header standard. According to still other exemplary implementations, the header information may pertain to other protocols and/or other information associated with one or multiple layers (e.g., transport, link, application, network, session, etc.).

When it is determined that the user approves of the transmission of the packet (block 625—YES), the packet may be transmitted (block 635). For example, PMS device 110 may transmit the packet to external network 130. PMS device 110 may also perform a logging procedure.

Referring to FIG. 6B, in block 640, the destination of the packet may be identified. For example, PMS device 110 may read the destination of the packet from the logged data of the packet. In block 645, it may be determined whether a list includes the destination. For example, PMS device 110 may store a list (or other data structure) that includes destination addresses that may be approved by a user or are considered to maintain an acceptable privacy level. According to an exemplary embodiment, the user may modify the list via a mobile application or user interface 207 of PMS device 110. According to an exemplary embodiment, a service provider of the privacy management service and/or PMS device 110 (e.g., an Internet service provider, a television service provider, etc.) may initially configure the list and/or provide updates to the list.

In block 645, it may be determined whether the destination address is included in the list. For example, PMS device 110 may compare the destination address of the packet to a destination addressed included in the stored list. When it is determined that the destination address is not included in the list (block 645—NO), the destination address may be added to the list (block 650). For example, PMS device 110 may update the list to include the destination address of the packet. When it is determined that the destination list is included in the list (block 645—YES), a logging procedure may be performed (block 655). For example, PMS device 110 may store information related to the list transaction (e.g., last confirmed data pertaining to the destination address, etc.).

FIGS. 6A and 6B illustrate an exemplary process 600 of the privacy management service, however, according to other embodiments, process 600 may include additional operations, fewer operations, and/or different operations than those illustrated in FIGS. 6A and 6B, and described herein. For example, process 600 may include PMS device 110 identifying various operational modes, configurations (e.g., privacy level, etc.), operational states of end device 115 (e.g., listening or capturing data, connection states, etc.).

Figure 7A:
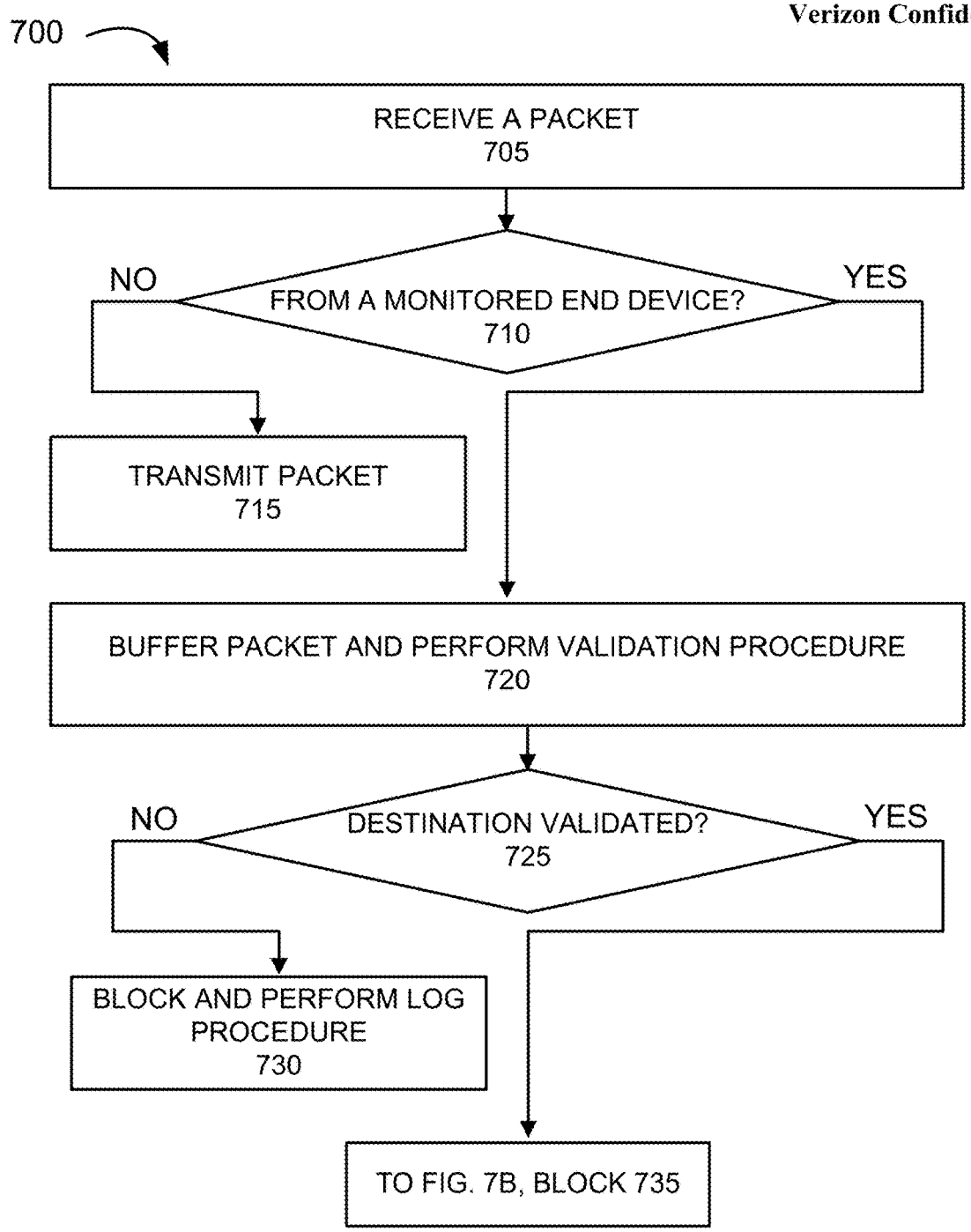
FIGS. 7A and 7B are a flow diagram illustrating another exemplary process of an exemplary embodiment of the privacy management service.
Figure 7B:
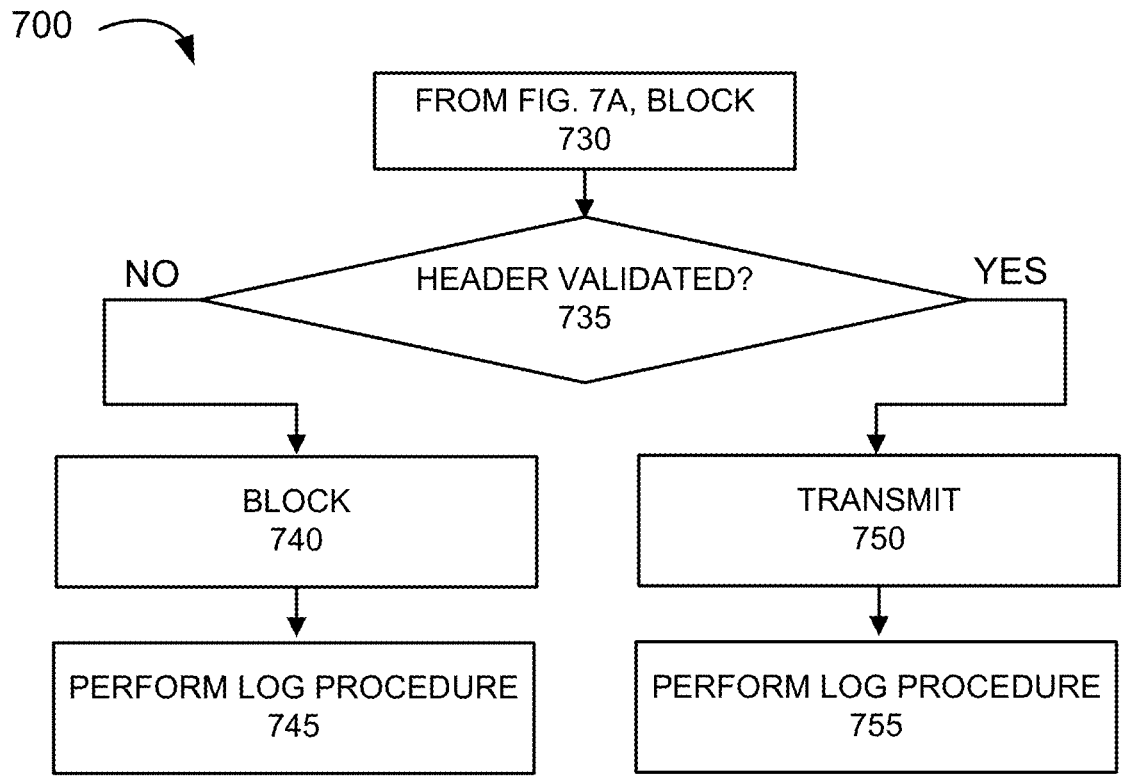

FIGS. 7A and 7B are a flow diagram illustrating another exemplary process 700 of an exemplary embodiment of the privacy management service. According to an exemplary embodiment, PMS device 110 may perform steps of process 700. According to an exemplary implementation, processor 510 executes software 520 to perform a step illustrated in FIGS. 7A and 7B, and described herein. Alternatively, a step illustrated in FIGS. 7A and 7B and described herein, may be performed by execution of only hardware. According to some exemplary embodiments, process 700 may be performed when PMS device 110 operates in an autonomous mode (e.g., a learned or trained mode based on machine learning or artificial intelligence), as described herein.

Referring to FIG. 7A, in block 705, a packet may be received. For example, PMS device 110 may receive a packet from end device 115. In block 710, it may be determined whether the end device is monitored or not. For example, PMS device 110 may determine whether end device 115 is included in the privacy management information (e.g., table 300). PMS device 110 may correlate the packet to end device 115 based on header information (e.g., source network address) of the packet, for example, and/or other information (e.g., port number, etc.).

When it is determined that the packet is not from a monitored end device (block 710—NO), the packet may be transmitted (block 715). For example, PMS device 110 may determine that the packet may be received from end device 115 that is not subject to the privacy management service. When it is determined that the packet is from a monitored end device (block 710—YES), the packet may be buffered and a validation procedure may be performed (block 720). For example, PMS device 110 may buffer the packet. PMS device 110 may also read the destination address of the packet.

In block 725, it may be determined whether the destination is validated. For example, PMS device 110 may compare the destination address of the packet to a list (e.g., as described in relation to process 600). PMS device 110 may determine whether the destination address matches at least one of the destination addresses included in the list based on a result of the comparison. PMS device 110 may perform other validation operations or procedures. For example, other context information may be used, such as time of day, user preferences, user behavior, and so forth, as described herein.

When it is determined that the destination is not validated (block 725—NO), the transmission of the packet may be blocked (block 730). For example, when the destination address of the packet is not included in the list, PMS device 110 may drop or block the packet. Additionally, or alternatively, a failure associated with another type of validation procedure may cause PMS device 110 to drop or block the transmission of the packet. Additionally, for example, PMS device 110 may perform a logging procedure in which a portion of the packet may be stored, etc., as previously described.

Referring to FIG. 7B, in block 735, it may be determined whether the header is validated. For example, PMS device 110 may compare the header of the packet to a blocked repository and an allowed repository, which may store headers of packets that were previously blocked and allowed. PMS device 110 may analyze the header information to determine even if not identical to the stored header information whether there is sufficient similarity between the stored header information and the header information of the packet to determine whether to transmit the packet or not. PMS device 110 may compare various instances of header information, as described herein, to identify a threshold level of similarity.

When it is determined that the header of the packet is not validated (block 735—NO), the packet may be blocked (block 740). For example, PMS device 110 may block or drop the packet. In block 745, PMS device 110 may perform a logging procedure. For example, PMS device 110 may store the header information with previously stored header information of packets that were previously blocked from transmission.

When it is determined that the header of the packet is validated (block 735—YES), the packet may be transmitted (block 750). For example, PMS device 110 may transmit the packet to external network 130. In block 755, PMS device 110 may perform a logging procedure. For example, PMS device 110 may store the header information with previously stored header information of packets that were previously transmitted.

FIGS. 7A and 7B illustrate an exemplary process 700 of the privacy management service, however, according to other embodiments, process 700 may include additional operations, fewer operations, and/or different operations than those illustrated in FIGS. 7A and 7B, and described herein. For example, process 700 may include PMS device 110 identifying various operational modes, configurations (e.g., privacy level, etc.), operational states of end device 115 (e.g., listening or capturing data, connection states, etc.).

Figure 8:
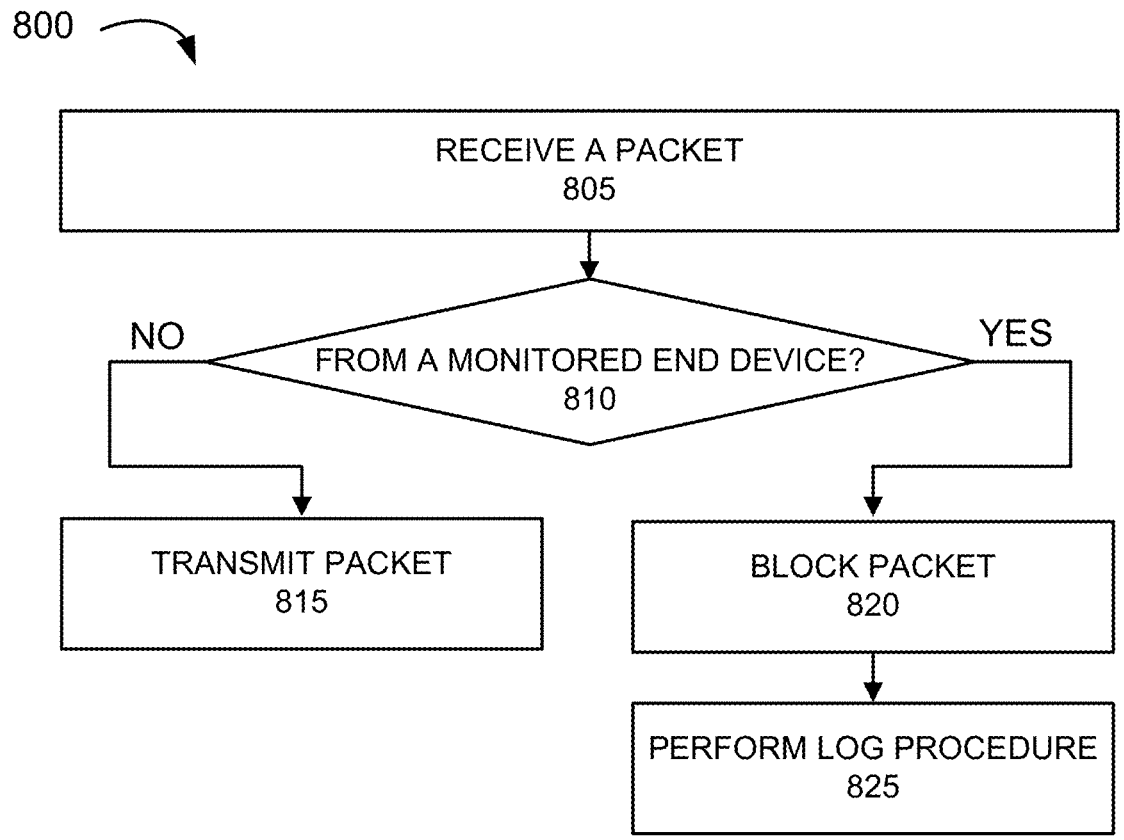
FIG. 8 is a flow diagram illustrating yet another exemplary process of an exemplary embodiment of the privacy management service.

FIG. 8 a flow diagram illustrating yet another exemplary process 800 of an exemplary embodiment of the privacy management service. According to an exemplary embodiment, PMS device 110 may perform steps of process 800. According to an exemplary implementation, processor 510 executes software 520 to perform a step illustrated in FIG. 8, and described herein. Alternatively, a step illustrated in FIG. 8 and described herein, may be performed by execution of only hardware. According to some exemplary embodiments, process 800 may be performed when PMS device 110 operates in a privacy mode, as described herein.

Referring to FIG. 8, in block 805, a packet may be received. For example, PMS device 110 may receive a packet from end device 115. In block 810, it may be determined whether the end device is monitored or not. For example, PMS device 110 may determine whether end device 115 is included in the privacy management information (e.g., table 300). PMS device 110 may correlate the packet to end device 115 based on header information (e.g., source network address) of the packet, for example, and/or other information (e.g., port number, etc.).

When it is determined that the packet is not from a monitored end device (block 810—NO), the packet may be transmitted (block 815). For example, PMS device 110 may determine that the packet may be received from end device 115 that is not subject to the privacy management service. When it is determined that the packet is from a monitored end device (block 810—YES), the packet may be blocked (block 820). For example, PMS device 110 may block or drop the transmission of the packet to external network 130. In block 825, a logging procedure may be performed. For example, PMS device 110 may store the header information and other information pertaining to the event.

FIG. 8 illustrates an exemplary process 800 of the privacy management service, however, according to other embodiments, process 800 may include additional operations, fewer operations, and/or different operations than those illustrated in FIG. 8, and described herein. For example, according to other exemplary embodiments, process 800 may be performed in relation to a packet not received from end device 115. For example, a packet that may be received via a microphone of PMS device 110 and directed to the smart speaker service of PMS device 110, may be blocked. Additionally for example, process 800 may include PMS device 110 identifying various operational modes, configurations (e.g., privacy level, etc.), operational states of end device 115 (e.g., listening or capturing data, connection states, etc.).

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive. For example, according to some exemplary embodiments, end device 115 may provide the privacy management service, as described in relation to PMS device 110. For example, a smart speaker or another type of end device 115 may include NLU logic, artificial intelligence and/or machine learning logic, operate in various modes (e.g., privacy mode, training or learning mode, autonomous mode, etc.), block, pass through, and/or filter various types of traffic, and so forth. End device 115 may provide the privacy management service in relation to its own traffic and/or traffic of another end device 115. According to yet other exemplary embodiments, end device 115 and/or PMS device 110 may provide the privacy management service according to a binary choice, as described herein.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations. The term "packet," as used herein, is intended to be broadly interpreted to include a data transmission or communication, the packaging of which may correspond to, for example, a packet, a cell, a frame, a datagram, some other type of container or unit of data, and/or a fragment thereof.

In addition, while series of blocks have been described with regard to the processes illustrated in FIGS. 6A, 6B, 7A, 7B, and 8, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   providing, by an in-home device, connectivity to end devices and an external network, wherein the in-home device is configured to provide a privacy service that includes blocking, transmitting, and filtering packets received from one or more of the end devices destined to the external network based on a privacy level of the in-home device, and wherein the in-home device includes multiple privacy levels;
   receiving, by the in-home device, a packet that includes voice data from an end device of the end devices;
   determining, by the in-home device, that the end device is subject to the privacy service of the in-home device;
   identifying, by the in-home device, the privacy level of the in-home device;
   determining, by the in-home device, whether to transmit, block, or filter the packet based on the identified privacy level, wherein whether to transmit, block, or filter the packet is a ternary choice;
   interpreting, by natural language understanding logic of the in-home device, the voice data;
   determining, by the in-home device, that the voice data includes sensitive information of a user of the privacy service; and
   filtering, by the in-home device, the packet based on the identified privacy level and that the voice data includes the sensitive information.

2. The method of claim 1, wherein the in-home device includes a wireless router, and wherein the end device is an Internet of Things (IoT) device, a smart speaker, or a video camera.

3. The method of claim 1, further comprising:
   storing, by the in-home device, destination addresses of first packets previously transmitted;
   comparing, by the in-home device, a destination address of the packet to the destination addresses;
   determining, by the in-home device, that the destination address matches one of the destination addresses; and
   transmitting, by the in-home device, the packet to the external network based on the identified privacy level and that the destination address matches the one of the destination addresses.

4. The method of claim 1, further comprising:
   receiving, by a user interface of the in-home device, a request from a user to change a privacy level of the end device; and
   transmitting, by the in-home device, a command to the end device that changes the privacy level of the end device.

5. The method of claim 4, wherein a change of the privacy level of the end device includes changing an operational state of a microphone, a video camera, or a sensor of the end device.

6. The method of claim 4, wherein a change of the privacy level of the end device includes disconnecting from or connecting to the external network.

7. The method of claim 4, further comprising:
notifying, by the in-home device, the user of a successful completion of a change of the privacy level of the end device.

8. The method of claim 1, wherein determining that the voice data includes the sensitive information is based on at least one of a user preference, a user behavior, or context information.

9. An in-home device comprising:
a communication interface;
a memory, wherein the memory stores instructions; and
a processor, wherein the processor executes the instructions to:
provide connectivity to end devices and an external network, wherein the in-home device is configured to provide a privacy service that includes blocking, transmitting, and filtering packets received from one or more of the end devices destined to the external network based on a privacy level of the in-home device, and wherein the in-home device includes multiple privacy levels;
receive, via the communication interface, a packet that includes voice data from an end device of the end devices;
determine that the end device is subject to the privacy service of the in-home device;
identify the privacy level of the in-home device;
determine whether to transmit, block, or filter the packet based on the identified privacy level, wherein whether to transmit, block, or filter the packet is a ternary choice;
interpret, by natural language understanding logic of the in-home device, the voice data;
determine that the voice data includes sensitive information of a user of the privacy service; and
filter the packet based on the identified privacy level and that the voice data includes the sensitive information.

10. The in-home device of claim 9, wherein the in-home device includes a wireless router, and wherein the end device is an Internet of Things (IoT) device, a smart speaker, or a video camera.

11. The in-home device of claim 9, wherein the processor further executes the instructions to:
store destination addresses of first packets previously transmitted;
compare a destination address of the packet to the destination addresses;
determine that the destination address matches one of the destination addresses; and
transmit, via the communication interface, the packet to the external network based on the identified privacy level and that the destination address matches the one of the destination addresses.

12. The in-home device of claim 9, wherein the processor further executes the instructions to:
receive, by a user interface of the in-home device, a request from a user to change a privacy level of the end device; and
transmit, via the communication interface, a command to the end device that changes the privacy level of the end device.

13. The in-home device of claim 12, wherein a change of the privacy level of the end device includes changing an operational state of a microphone, a video camera, or a sensor of the end device.

14. The in-home device of claim 12, wherein a change of the privacy level of the end device includes disconnecting from or connecting to the external network.

15. The in-home device of claim 12, wherein the processor further executes the instructions to:
notify the user of a successful completion of a change of the privacy level of the end device.

16. The in-home device of claim 9, wherein determining that the voice data includes the sensitive information is based on at least one of a user preference, a user behavior, or context information.

17. A non-transitory computer-readable storage medium storing instructions executable by a processor of an in-home device, which when executed cause the in-home device to:
provide connectivity to end devices and an external network, wherein the in-home device is configured to provide a privacy service that includes blocking, transmitting, and filtering packets received from one or more of the end devices destined to the external network based on a privacy level of the in-home device, and wherein the in-home device includes multiple privacy levels;
receive a packet that includes voice data from an end device of the end devices;
determine that the end device is subject to the privacy service of the in-home device;
identify the privacy level of the in-home device;
determine whether to transmit, block, or filter the packet based on the identified privacy level, wherein whether to transmit, block, or filter the packet is a ternary choice;
interpret, by natural language understanding logic of the in-home device the voice data;
determine that the voice data includes sensitive information of a user of the privacy service; and
filter the packet based on the identified privacy level and that the voice data includes the sensitive information.

18. The non-transitory computer-readable storage medium of claim 17, wherein the in-home device includes a wireless router, and wherein the end device is an Internet of Things (IoT) device, a smart speaker, or a video camera.

19. The non-transitory computer-readable storage medium of claim 17, wherein the instructions further comprise instructions, which when executed cause the in-home device to:
store destination addresses of first packets previously transmitted;
compare a destination address of the packet to the destination addresses;
determine that the destination address matches one of the destination addresses; and
transmit the packet based on the identified privacy level and that the destination address matches the one of the destination addresses.

20. The non-transitory computer-readable storage medium of claim 19, wherein the instructions further comprise instructions, which when executed cause the in-home device to:

receive, by a user interface of the in-home device, a request from a user to change a privacy level of the end device; and transmit a command to the end device that changes the privacy level of the end device.

* * * * *